United States Patent
Futahashi et al.

(10) Patent No.: US 9,096,212 B2
(45) Date of Patent: Aug. 4, 2015

(54) VEHICLE AND METHOD FOR CONTROLLING SAME

(75) Inventors: Kensuke Futahashi, Tokyo (JP); Kiyomitsu Ogawa, Tokyo (JP); Megumu Tsuruta, Tokyo (JP)

(73) Assignee: MITSUBISHI NICHIYU FORKLIFT CO., LTD., Kyoto (JP)

( * ) Notice: Subject to any disclaimer, the term of this patent is extended or adjusted under 35 U.S.C. 154(b) by 182 days.

(21) Appl. No.: 13/879,749

(22) PCT Filed: Oct. 19, 2011

(86) PCT No.: PCT/JP2011/074005
§ 371 (c)(1),
(2), (4) Date: Apr. 16, 2013

(87) PCT Pub. No.: WO2012/053533
PCT Pub. Date: Apr. 26, 2012

(65) Prior Publication Data
US 2013/0204500 A1    Aug. 8, 2013

(30) Foreign Application Priority Data
Oct. 19, 2010    (JP) ................................ 2010-234555

(51) Int. Cl.
*B60W 10/06*    (2006.01)
*B60W 10/30*    (2006.01)
(Continued)

(52) U.S. Cl.
CPC ............... *B60W 10/06* (2013.01); *B60K 6/48* (2013.01); *B60W 10/30* (2013.01); *B60W 30/00* (2013.01);
(Continued)

(58) Field of Classification Search
CPC ............... E02F 9/2246; B60L 2200/40; B60L 2200/42; B60W 10/30; B60W 10/06; B60W 30/00; B60W 2600/00; B60Y 2200/15
USPC ........................................................... 701/50
See application file for complete search history.

(56) References Cited

U.S. PATENT DOCUMENTS 8,573,339 B2 * 11/2013 Futahashi et al. .......... 180/65.21
8,607,558 B2 * 12/2013 Kawaguchi et al. ............ 60/431
(Continued)

FOREIGN PATENT DOCUMENTS

JP    05-044517 A    2/1993
JP    2003-269211 A    9/2003
(Continued)

OTHER PUBLICATIONS

International Search Report dated Nov. 15, 2011 for International Application No. PCT/JP2011/074005.
(Continued)

*Primary Examiner* — Jason Holloway
(74) *Attorney, Agent, or Firm* — Birch, Stewart, Kolasch & Birch, LLP

(57) ABSTRACT

In a vehicle and a method of controlling the same, a controller determines whether an idle-stop condition is satisfied or not when an engine is driven, and stops idling of the engine when it is determined that the idle-stop condition is satisfied. In addition, while the idling of the engine is stopped, when an operation order given to a fork driving cylinder by manipulation of a cargo handling lever is received, the controller starts the engine, and switches an oil pump for cargo handling of the fork driving cylinder to an on-load state before an engine revolution number reaches an idling revolution number region.

8 Claims, 6 Drawing Sheets

(51) Int. Cl.
*F02D 29/02* (2006.01)
*F02D 29/04* (2006.01)
*F02N 11/08* (2006.01)
*B60W 30/00* (2006.01)
*B60K 6/48* (2007.10)
*B60K 25/02* (2006.01)
*B60K 26/02* (2006.01)

(52) U.S. Cl.
CPC ............... *F02D 29/02* (2013.01); *F02D 29/04* (2013.01); *F02N 11/084* (2013.01); *B60K 2006/4825* (2013.01); *B60K 2025/026* (2013.01); *B60K 2026/025* (2013.01); *B60W 2300/17* (2013.01); *B60W 2600/00* (2013.01); *B60Y 2200/15* (2013.01); *Y02T 10/48* (2013.01); *Y02T 10/6221* (2013.01); *Y02T 10/6252* (2013.01)

(56) References Cited

U.S. PATENT DOCUMENTS

| | | | |
|---|---|---|---|
| 2003/0089106 A1* | 5/2003 | Ioku et al. | 60/328 |
| 2008/0254939 A1* | 10/2008 | Ichimura | 477/107 |
| 2010/0064677 A1* | 3/2010 | Kawaguchi et al. | 60/431 |
| 2011/0056755 A1* | 3/2011 | Futahashi et al. | 180/65.25 |
| 2012/0003069 A1* | 1/2012 | Hagiwara et al. | 414/685 |

FOREIGN PATENT DOCUMENTS

| | | |
|---|---|---|
| JP | 2005-351202 A | 12/2005 |
| JP | 3797805 B2 | 7/2006 |
| JP | 2010-78135 A | 4/2010 |
| WO | 2005/054649 A1 | 6/2005 |
| WO | WO 2009/118924 A1 | 10/2009 |

OTHER PUBLICATIONS

Office Action mailed May 7, 2014 for related Japanese Application No. 2010-234555 with an English translation.

* cited by examiner

VEHICLE AND METHOD FOR CONTROLLING SAME

TECHNICAL FIELD

The present invention relates to a vehicle including a hydraulic actuator operated by a hydraulic pressure, a hydraulic power source configured to apply a hydraulic pressure to the hydraulic actuator, and a motor configured to drive the hydraulic power source and provide a travel-driving force, and a method of controlling the same.

Priority is claimed on Japanese Patent Application No. 2010-234555 filed on Oct. 19, 2010, the content of which is incorporated herein by reference.

BACKGROUND ART

In an industrial vehicle such as a forklift or a shovel car, hydraulic power sources respectively installed at a plurality of hydraulic actuators are driven by an engine configured to provide a travel-driving force.

As described above, the vehicle in which the hydraulic power sources respectively installed at the plurality of hydraulic actuators is driven by the engine configured to provide the travel-driving force is disclosed in Patent Documents 1 and 2, which will be described below.

In a technique disclosed in Patent Document 1, a lock lever is installed to selectively switch all of a plurality of hydraulic circuits including a hydraulic pump, which is a hydraulic power source, to an operable state or to an inoperable state. When the plurality of hydraulic circuits is in the inoperable state due to manipulation of the lock lever, the engine is stopped. In this technique, in order to operate the hydraulic actuator from a state in which the engine is stopped, a key is manipulated to start the engine, the lock lever is manipulated to make all of the hydraulic circuits operable, and then, an operation order for a desired hydraulic actuator is applied.

In addition, in a technique disclosed in Patent Document 2, like the technique disclosed in Patent Document 1, a lock lever is installed to selectively switch all of a plurality of hydraulic circuits including a hydraulic pump, which is a hydraulic power source, to an operable state or to an inoperable state. When the plurality of hydraulic circuits is in the inoperable state due to manipulation of the lock lever, the engine is stopped. In addition, in this technique, when the hydraulic actuator is operated from a state in which the engine is stopped while a key switch is in an ON state, i.e., an idling-stop state, the engine is started and all of the hydraulic circuits are switched to the operable state by manipulating the lock lever, even without manipulating the key. After that, an operation order for the hydraulic actuator is applied, and a desired hydraulic load is driven.

RELATED ART DOCUMENT

Patent Document

[Patent Document 1] Japanese Unexamined Patent Application, First Publication No. H05-044517
[Patent Document 2] Japanese Patent No. 3797805

SUMMARY OF THE INVENTION

Problems to be Solved by the Invention

However, even in the techniques disclosed in both of Patent Documents 1 and 2, in order to operate the hydraulic actuator from the state in which the engine is stopped, a plurality of manipulations are needed and the start of the hydraulic actuator is time-consuming.

Here, the present invention is directed to provide a vehicle capable of operating a hydraulic actuator from a state in which idling of a motor is stopped, with a small amount of manipulation and for a short time, and a method of controlling the same.

Means for Solving the Problems

A vehicle according to a first aspect of the present invention includes a hydraulic actuator operated by a hydraulic pressure; a manipulating end configured to instruct an operation of the hydraulic actuator; a hydraulic power source configured to apply a hydraulic pressure to the hydraulic actuator; a motor configured to drive the hydraulic power source and provide a travel-driving force; and a controller configured to determine whether a predetermined idle-stop condition is satisfied or not while the motor is driven, stop idling of the motor when satisfaction of the idle-stop condition is determined, and start the motor and switches the hydraulic power source of the hydraulic actuator to an on-load state when an operation order given to the hydraulic actuator by manipulation of the manipulating end is received while the idling of the motor is stopped.

In the vehicle, during the idling-stop state, the motor is started by merely manipulating the manipulating end, and the hydraulic power source starts to be driven along with the starting of the motor. Further, the hydraulic power source switches to the on-load state, and the hydraulic actuator is operated. Accordingly, in the vehicle, even in the idling-stop state, the hydraulic actuator can be operated with a single manipulation and for a short amount of time.

Here, in the vehicle, while the idling of the motor is stopped, when the operation order given to the hydraulic actuator is received, the controller may start the motor, and switch the hydraulic power source of the hydraulic actuator to the on-load state before the motor reaches a predetermined idling revolution number region.

In the vehicle, before a revolution number of the motor is increased, the hydraulic actuator can be operated.

In addition, in the vehicle, the plurality of hydraulic power sources configured to apply a hydraulic pressure to the hydraulic actuator, a hydraulic pressure maintaining device configured to maintain the hydraulic pressure applied to the hydraulic actuator when all of the plurality of hydraulic power sources switches to an unload state, and a hydraulic pressure detector configured to detect the hydraulic pressure applied to the hydraulic actuator may be installed at the hydraulic actuator. While the idling of the motor is stopped, when an operation order given to the hydraulic actuator is received, the controller may start the motor, acquire a hydraulic pressure applied to the hydraulic actuator maintained by the hydraulic pressure maintaining device using the hydraulic pressure detector, and switch a number of hydraulic power sources corresponding to the magnitude of the hydraulic pressure to the on-load state.

In the vehicle, when the plurality of hydraulic power sources are installed with respect to the hydraulic actuator, since the number of hydraulic power sources corresponding to a magnitude of the hydraulic pressure applied to the hydraulic actuator switch to the on-load state, a load of the motor during the start of the motor can be reduced, and the motor can be securely started.

In addition, the vehicle may include the plurality of hydraulic actuators, the manipulating ends corresponding to the plurality of hydraulic actuators, and the hydraulic power sources corresponding to the plurality of hydraulic actuators. While the idling of the motor is stopped, among the plurality of hydraulic actuators, when an operation order given to two or more hydraulic actuators is received by the time the motor is started, the controller may start the motor based on a previously received operation order, determine the hydraulic actuator having the order of the highest priority among the two or more hydraulic actuators with reference to a predetermined order of priority, and switch only the hydraulic power source of the hydraulic actuator having the highest priority to the on-load state.

In the vehicle, even when a plurality of operation orders are received during the idling-stop, since only the hydraulic power source of one hydraulic actuator having the order of high priority switches to the on-load state, a load of the motor during the start of the motor can be reduced, and the motor can be securely started.

In addition, the vehicle may include the plurality of hydraulic actuators, the manipulating end corresponding to the plurality of hydraulic actuators, and the hydraulic power sources corresponding to the plurality of hydraulic actuators. A hydraulic pressure maintaining device and a hydraulic pressure detector may be installed at the at least one hydraulic actuator among the plurality of hydraulic actuators, wherein when the one hydraulic actuator transitions to an unload state from the on-load state, the hydraulic pressure maintaining device maintains a hydraulic pressure applied to one hydraulic actuator, and a hydraulic pressure detector detects a hydraulic pressure applied to the one hydraulic actuator. While the idling of the motor is stopped, when an operation order given to two hydraulic actuators including the one hydraulic actuator among the plurality of hydraulic actuators is received by the time the motor is started, the controller may start the motor based on a previously received operation order, acquire a hydraulic pressure applied to the one hydraulic actuator maintained by the hydraulic pressure maintaining device using the hydraulic pressure detector, and switch only the hydraulic power source of any one hydraulic actuator of the two hydraulic actuators to the on-load state according to the magnitude of the hydraulic pressure.

In the vehicle, even when a plurality of operation orders are received during the idling-stop, since only the hydraulic power source of one hydraulic actuator switches to the on-load state, the load of the motor during the start of the motor can be reduced, and the motor can be securely started.

According to a second aspect of the present invention, in a method of controlling a vehicle including a hydraulic actuator operated by a hydraulic pressure, a manipulating end configured to instruct an operation of the hydraulic actuator, a hydraulic power source configured to apply a hydraulic pressure to the hydraulic actuator, and a motor configured to drive the hydraulic power source and provide a travel-driving force, the method includes an idling-stop process of determining whether a predetermined idle-stop condition is satisfied when the motor is driven, and stopping idling of the motor when it is determined that the idle-stop condition is satisfied; and an idling-stop release process of starting the motor and switching the hydraulic power source of the hydraulic actuator to an on-load state, when an operation order given to the hydraulic actuator by manipulation of the manipulating end is received, while the idling of the motor is stopped.

In the control method, the motor is started by merely manipulating the manipulating end during the idling-stop state, and the hydraulic power source starts to be driven along with the start of the motor. Further, the hydraulic power source switches to the on-load state, and the hydraulic actuator is operated. Accordingly, in the control method, even in the idling-stop state, the hydraulic actuator can be operated with only one manipulation in a short amount of time.

Here, in the method of controlling the vehicle, in the idling-stop release process, while the idling of the motor is stopped, when the operation order given to the hydraulic actuator is received, the motor may be started, and before the motor reaches a predetermined idling revolution number, the hydraulic power source of the hydraulic actuator may be switched to the on-load state.

In the control method, before the revolution number of the motor is increased, the hydraulic actuator can be operated.

Effect of the Invention

According to the present invention, even in the idling-stop, the hydraulic actuator can be operated for a short time through only manipulation of the manipulating end.

MODES FOR CARRYING OUT THE INVENTION

Hereinafter, various embodiments of a vehicle according to the present invention will be described with reference to the accompanying drawings.

First Embodiment

First, a vehicle according to a first embodiment of the present invention will be described with reference to FIGS. 1 and 2.

Figure 1:
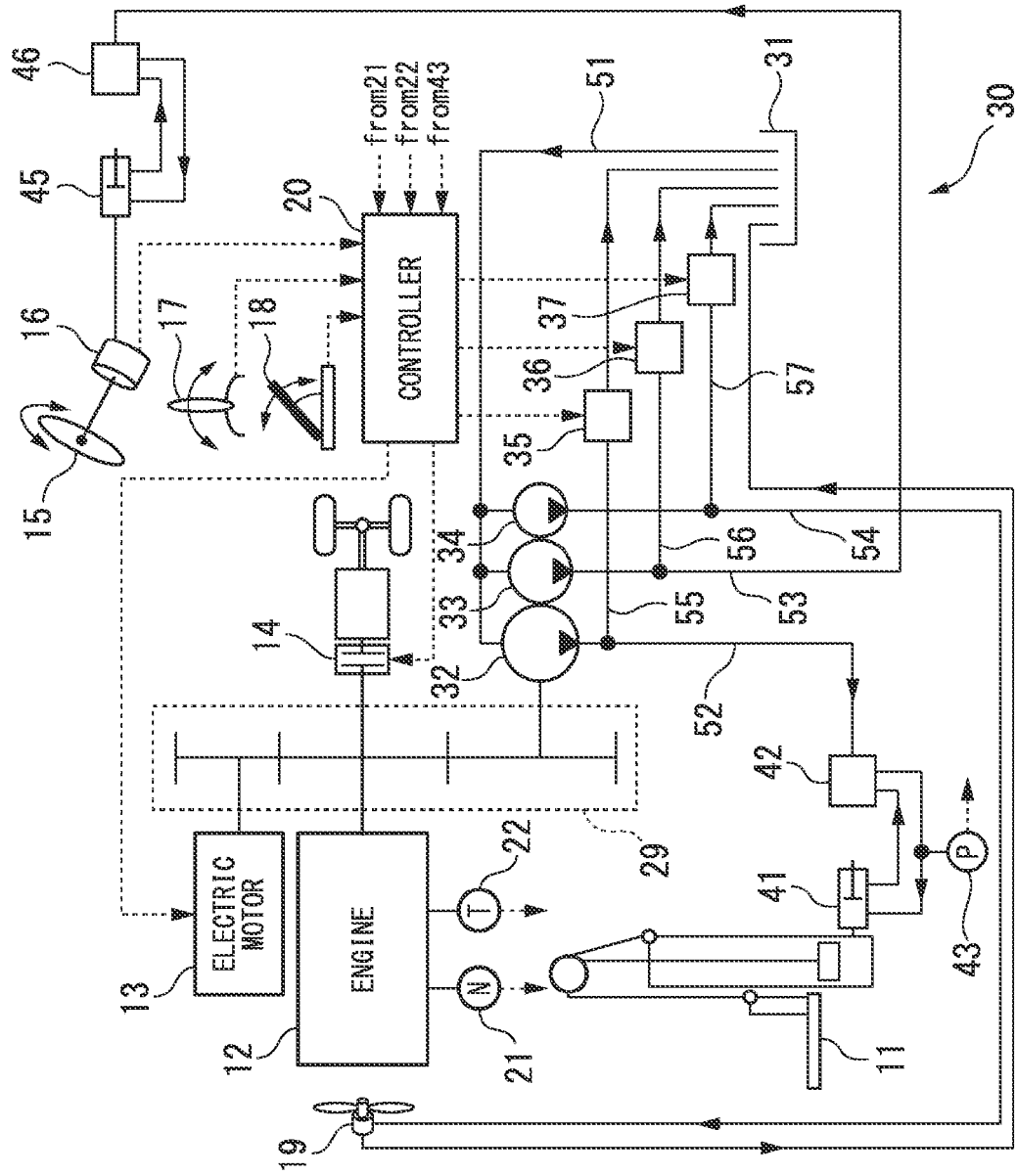
FIG. 1 is a view for describing a configuration of a vehicle according to a first embodiment of the present invention.
Figure 2:
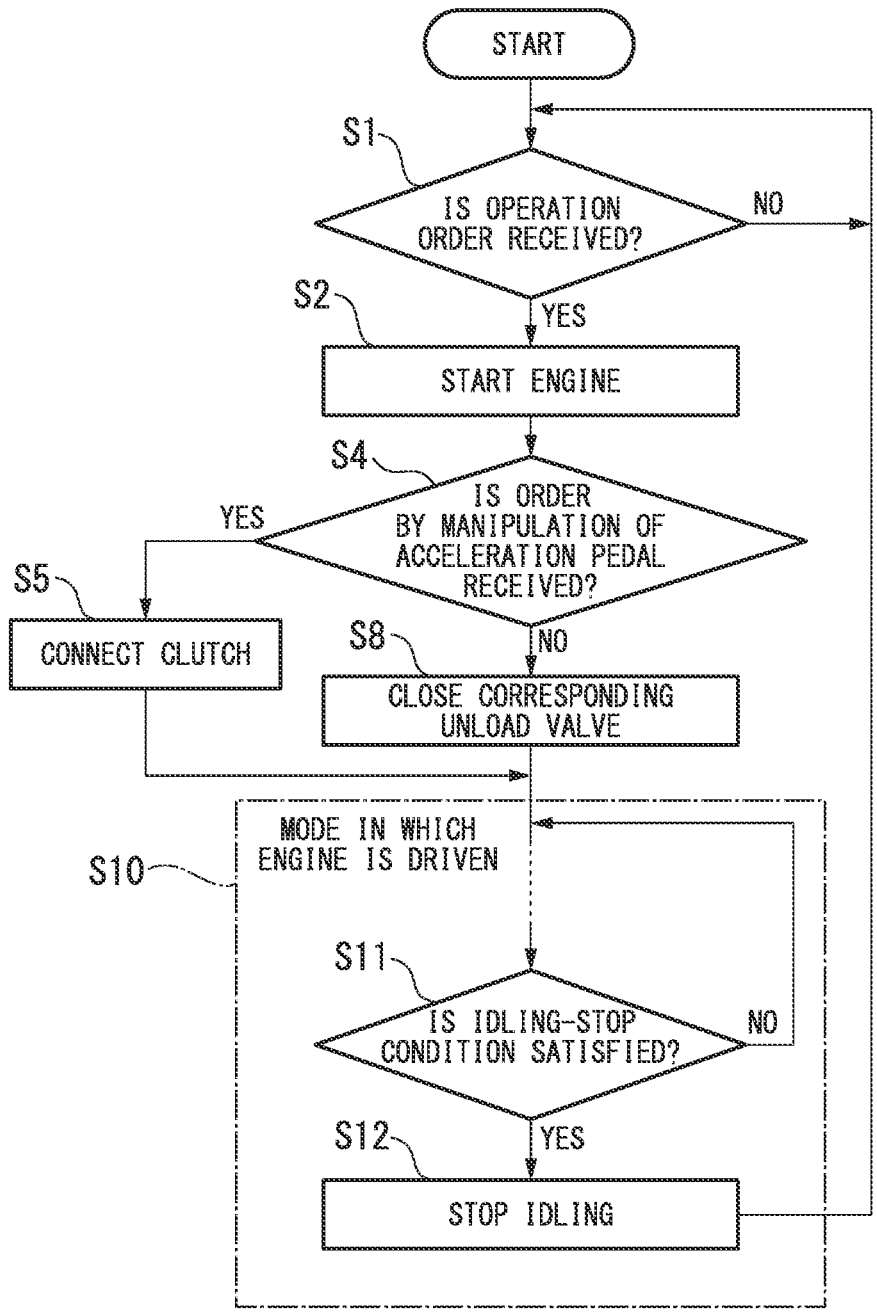
FIG. 2 is a flowchart showing an operation of a controller according to the first embodiment of the present invention.

As shown in FIG. 1, the vehicle of the embodiment is a forklift including a fork 11 configured to load cargo and move the cargo upward and downward.

The forklift includes the fork 11, an engine 12, which is a motor, an electric motor 13 configured to start the engine 12, a travel-driving mechanism including a clutch 14 or a shifting mechanism, a steering handle 15, a steering mechanism 16 configured to steer a steering wheel according to manipulation of the steering handle 15, a cargo handling lever 17 configured to apply an instruction such as upward and downward movement of the fork 11, an acceleration pedal 18, a cooling fan 19 configured to cool the engine 12, a hydraulic circuit 30 configured to operate the fork 11, the steering mechanism 16 and the cooling fan 19, and a controller 20 (controller) configured to control the engine 12, the electric motor 13, the hydraulic circuit 30 and the like.

Various sensors such as a revolution number sensor 21 or a temperature sensor 22 are attached to the engine 12.

The hydraulic circuit 30 includes an oil tank 31 filled with oil, an oil pump 32 for cargo handling, an oil pump 33 for steering, an oil pump 34 for the fan, an unload valve 35 for cargo handling configured to switch the oil pump 32 for cargo handling to an on-load state and an unload state, an unload valve 36 for steering configured to switch the oil pump 33 for steering to the on-load state and the unload state, an unload valve 37 for the fan configured to switch the oil pump 34 for the fan to the on-load state and the unload state, a fork driving cylinder 41 operated by oil from the oil pump 32 for cargo handling, a control valve 42 for cargo handling configured to control a flow rate of the oil from the oil pump 32 for cargo handling to the fork driving cylinder 41, a cylinder pressure sensor 43 (a hydraulic pressure detector) configured to detect a hydraulic pressure applied to the fork driving cylinder 41, a steering driving cylinder 45 operated by the oil from the oil pump 33 for steering, and a control valve 46 for steering configured to control a flow rate of the oil from the oil pump 33 for steering to the steering driving cylinder 45.

The oil pumps 32, 33 and 34 are connected to a drive shaft of the engine 12 and a rotary shaft of the electric motor 13 via a transmission mechanism 29. For this reason, when the electric motor 13 is driven, the engine 12 and the oil pumps 32, 33 and 34 are also driven. In addition, when the engine 12 is driven, the oil pumps 32, 33 and 34 are also driven by the driving force.

A suction line 51 configured to suction the oil filled in the oil tank 31, and ejection lines 52, 53 and 54 through which the oil pressurized by the oil pumps 32, 33 and 34 flows, are connected to the oil pumps 32, 33 and 34. The ejection lines 52, 53 and 54 corresponding to the oil pumps 32, 33 and 34 are branched on the way, one sides thereof are directly connected to the cylinders 41, 45 and 19 as ejection lines, and the other sides thereof are connected to the oil tank 31 as return lines 55, 56 and 57.

All of the corresponding unload valves 35, 36 and 37 of the oil pumps 32, 33 and 34 are installed in the middle of the corresponding return lines of the oil pumps. The unload valves 35, 36 and 37 switch to an on-load state in which a hydraulic pressure is applied to the corresponding cylinders 41, 45 and 19 by the oil from the corresponding oil pumps 32, 33 and 34 by being in a closed state. In addition, the unload valves 35, 36 and 37 switch to an unload state in which the oil from the corresponding oil pumps 32, 33 and 34 returns to the oil tank 31 and the hydraulic pressure is not applied to the corresponding cylinders 41, 45 and 19 by being in an open state.

The control valve 42 for cargo handling (the hydraulic pressure maintaining device) is connected to a tip of an ejection line 52 of the oil pump 32 for cargo handling (the hydraulic power source). The fork driving cylinder 41 (the hydraulic actuator) is connected to a tip of the control valve 42 for cargo handling. In addition, the control valve 46 for steering (the hydraulic pressure maintaining device) is connected to a tip of an ejection line 53 of the oil pump 33 for steering (the hydraulic power source). The steering driving cylinder 45 (the hydraulic actuator) is connected to a tip of the control valve 46 for steering. In addition, the cooling fan (the hydraulic actuator) 19 is connected to a tip of an ejection line of the oil pump 34 for the fan. (the hydraulic power source)

Next, an operation of the controller will be described according to the flowchart of FIG. 2.

Here, in the engine 12, in the idling-stop state, the unload valves 35, 36 and 37 are in the open state, i.e., the oil pumps 32, 33 and 34 are in the unload state. In addition, the idling-stop state refers to a state in which the engine 12 is stopped while a key switch is ON, since a predetermined idling-stop condition is satisfied after the key switch of the forklift is ON and the engine 12 is driven once. In addition, for example, here, the idling-stop condition refers to a condition in which any one of the acceleration pedal 18, the handle 15, and the cargo handling lever 17 is not manipulated for a predetermined time.

When any one of the acceleration pedal (the manipulating end) 18, the handle (the manipulating end) 15, and the cargo handling lever (the manipulating end) 17 is manipulated and an operation order is received from any one of them in the idling-stop state (S1), the controller 20 drives the electric motor 13 and starts the engine 12 (S2). In addition, here, the controller 20 outputs a fuel supply order and starts fuel supply to the engine 12. Further, the oil pumps 32, 33 and 34 begin to be driven by start of the engine 12.

Next, the controller 20 determines whether a previous operation order is an order by manipulation of the acceleration pedal 18 or not (S4). When the controller 20 determines that the order is the order by manipulation of the acceleration pedal 18, after the engine 12 is started and a predetermined time elapses, i.e., a revolution number of the engine 12 is sufficiently increased, if the brake is not applied, a connection order is output to the clutch 14 and the clutch 14 switches to the connection state (S5).

Meanwhile, when the controller 20 determines that the order is not the order by manipulation of the acceleration pedal 18, i.e., the order is the order by manipulation of the cargo handling lever 17 or the handle 15, before the engine 12 reaches a predetermined idling revolution number region, only the unload valves 35 and 36 are closed and only the oil pumps 32 and 33 are in the on-load state (S8). As a result, the oil from the oil pumps 32 and 33 is sent to the cylinders 41 and 45 via the control valves 42 and 46, and the cylinders 41 and 45 are operated.

Specifically, for example, when the controller 20 receives the operation order by manipulation of the cargo handling lever 17, the unload valve 35 for cargo handling is closed. In this case, the oil from the oil pump 32 for cargo handling is sent to the fork driving cylinder 41 via the control valve 42 for cargo handling, and the fork driving cylinder 41 is operated. As a result, the fork 11 is moved upward and downward. In addition, the controller 20 closes the unload valve 36 for steering when the operation order by manipulation of the handle 15 is received. In this case, the oil from the oil pump 33 for steering is sent to the steering driving cylinder 45 via the control valve 46 for steering, and the steering driving cylinder 45 is operated. As a result, the steering mechanism 16 is driven.

When processing of step 5 or step 8 is completed, the controller 20 starts control in a mode in which an engine is driven (S10). In the mode in which the engine is driven (S10), control of the hydraulic circuit 30 or the like performed as in the related art is performed.

When the operation order by manipulation of the cargo handling lever 17 or the handle 15 is received by control of the hydraulic circuit 30 in the mode in which the engine is driven, the controller 20 closes the unload valves 35 and 36 and the oil pumps 32 and 33 switch to the on-load state. In addition, when the operation order is not input by manipulation of the cargo handling lever 17 or the handle 15, the unload valves 35 and 36 are opened and the oil pumps 32 and 33 switch to the unload state. Further, in the controller 20, when an output value from the temperature sensor 22 attached to the engine 12 exceeds a predetermined value, i.e., when the engine 12 reaches a high temperature, the unload valve 37 for the fan is closed, the oil pump 34 for the fan switches to the on-load state and the cooling fan 19 is operated, and when the temperature of the engine 12 is lowered, the unload valve 37 for the fan is opened, the oil pump 34 for the fan switches to the unload state and the cooling fan 19 is stopped.

Further, in the controller 20, when the engine revolution number is not too high, if any one of the cylinder pressures is increased, based on the order of priority or the like, any one of the unload valves is opened, and the engine load is reduced. In addition, in some cases, a fuel supply signal is output to the engine 12, the fuel amount is increased, and the engine revolution number is increased to correspond to an increase in engine load.

In the mode in which the engine is driven (S10), the controller 20 further performs determination processing (S11) of whether the above-mentioned idling-stop condition is satisfied and idling-stop processing (S12) when the idle-stop condition is satisfied.

The controller 20 maintains the mode in which the engine is driven (S10) when it is determined that the idling-stop condition is not satisfied in the determination processing (S11). In addition, the controller 20 performs the above-mentioned idling-stop processing (S12) when it is determined that the idling-stop condition is satisfied in the determination processing (S11). The controller 20 outputs a fuel supply stop order or the like to the engine 12 to stop the engine 12 in the idling-stop processing (S12). The controller 20 transitions to the determination processing of step 1 when the idling-stop processing (S12) is terminated.

Hereinabove, in the embodiment, in the idling-stop state, the engine 12 can be started by merely manipulating the cargo handling lever 17 or the handle 15, and the cylinders 41 and 45 can be operated. Furthermore, since the cylinders 41 and 45 are operated before the engine 12 reaches the idling revolution region, a time from the idling-stop state to initiation of the operation of the cylinders 41 and 45 can be reduced.

Second Embodiment

Figure 3:
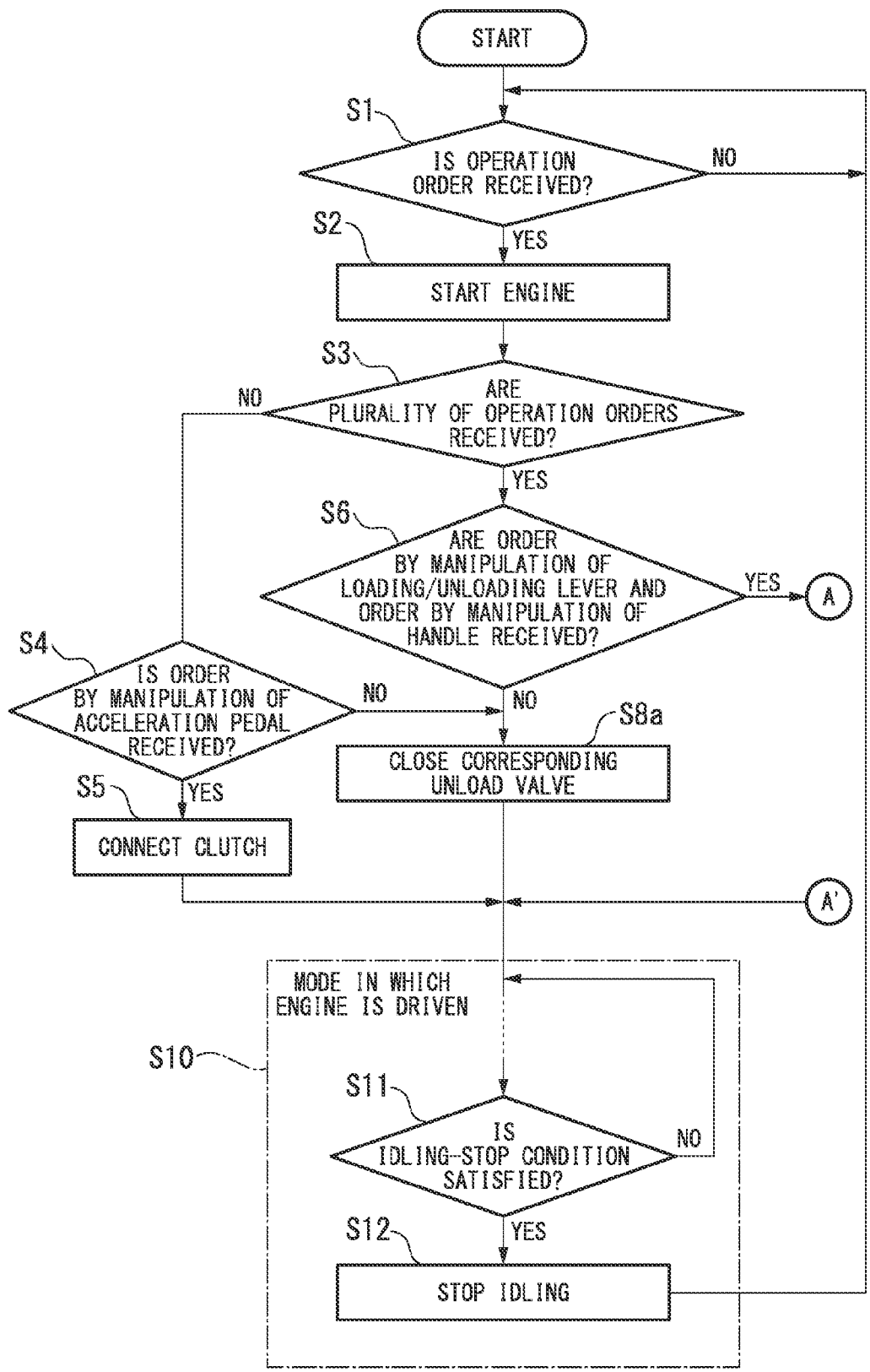
FIG. 3 is a flowchart (first) showing an operation of a controller according to a second embodiment of the present invention.
Figure 4:
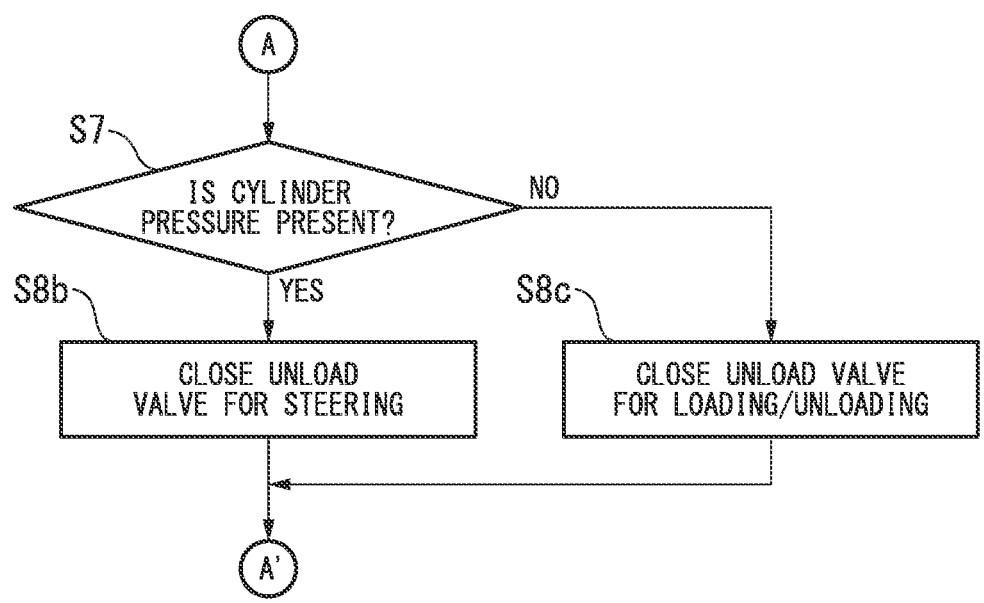
FIG. 4 is a flowchart (second) showing an operation of the controller according to the second embodiment of the present invention.

Next, a vehicle according to a second embodiment of the present invention will be described with reference to FIGS. 3 and 4.

The vehicle of the embodiment is a forklift having the same configuration as shown in FIG. 1. However, in the embodiment, an operation of a controller 20 of the forklift is different from that of the first embodiment. Hereinafter, the operation of the controller 20 will be described according to flowcharts shown in FIGS. 3 and 4.

Like the first embodiment, in the idling-stop state, when any one of the acceleration pedal 18, the handle 15 and the cargo handling lever 17 is manipulated and an operation order from any one of them is received (S1), the controller 20 drives the electric motor 13 and starts the engine 12 (S2).

Here, in the idling-stop state, there is a case that the controller 20 receives another operation order after one operation order is received and by the time the engine 12 is started. In the embodiment, the other operation order is considered to be received. In addition, in the first embodiment, the other operation order is neglected.

In the idling-stop state, the controller 20 drives the electric motor 13 and starts the engine 12 (S2) based on the earliest operation order, regardless of reception of one operation order or reception of a plurality of operation orders.

Next, the controller 20 determines whether the plurality of operation orders are received or not (S3).

When it is determined that the plurality of operation orders are not received, i.e., only one operation order is received, the controller 20 determines whether the order is an order by manipulation of the acceleration pedal 18 (S4). When it is determined that the order is the order by manipulation of the acceleration pedal 18, like the processing in step 5 of the first embodiment, the controller 20 performs clutch connection processing (S5) and transitions to the above-mentioned mode in which the engine is driven (S10). In addition, when it is determined that the order is not the order by manipulation of the acceleration pedal 18, i.e., the order is the order by manipulation of the cargo handling lever 17 or the handle 15, like in step 8 of the first embodiment, before the engine 12 reaches a predetermined idling revolution number region, the controller 20 closes only the unload valves 35 and 36, switches only the oil pumps 32 and 33 to an on-load state (S8a), and transitions to the above-mentioned mode in which the engine is driven (S10).

In addition, in step 3, when it is determined that the plurality of operation orders are received, the controller 20 determines whether the order by manipulation of the cargo handling lever 17 and the order by manipulation of the handle 15 is received or not (S6).

When it is determined that the order by manipulation of the cargo handling lever 17 and the order by manipulation of the handle 15 are not received, i.e., the order by manipulation of the acceleration pedal 18 and the order by manipulation of the cargo handling lever 17, or the order by manipulation of the acceleration pedal 18 and the order by manipulation of the handle 15 are received, the controller 20 closes only the unload valves 35 and 36, switches only the oil pumps 32 and 33 to the on-load state (S8a), and transitions to the above-mentioned mode in which the engine is driven (S10) without performing the clutch connection processing.

In step 6, when it is determined that the order by manipulation of the cargo handling lever 17 and the order by manipulation of the handle 15 are received, the controller 20 acquires output from the cylinder pressure sensor 43 of the fork driving cylinder 41, and determines whether a cylinder pressure is larger than a predetermined lift pressure or not (S7).

Here, the cylinder pressure corresponding to a weight of cargo when the cargo is actually lifted is applied to the fork driving cylinder 41. In addition, even when the cargo is not placed on the fork 11, when the fork 11 is lifted, the cylinder pressure due to the lift of the fork 11 or due to the lifted fork 11 is applied. Meanwhile, when the fork 11 is disposed at the lowermost position, the cylinder pressure is not substantially applied, regardless of whether the cargo is placed on the fork 11 or not.

The control valve 42 for cargo handling prevents the hydraulic pressure from coming out of the fork driving cylinder 41 and maintains the cylinder pressure just before the opening of the unload valve 35 for cargo handling when the unload valve 35 for cargo handling is opened, such that the fork 11 is not lowered due to discharge of the hydraulic pressure from the fork driving cylinder 41 even when the unload valve 35 for cargo handling is opened. For this reason, by determining whether the output from the cylinder pressure sensor 43 is larger than the above-mentioned lift pressure or not, even when the unload valve 35 for cargo handling is opened, it is possible to determine whether a state in which the fork 11 is being raised or a state in which the fork 11 is disposed at the lowermost position.

In step 7, when it is determined that the cylinder pressure is larger than the lift pressure, i.e., the fork 11 is being raised, the controller 20 closes the unload valve 36 for steering, switches only the oil pump 33 for steering to the on-load state (S8b), and transitions to the above-mentioned mode in which the engine is driven (S10).

In addition, in step 7, when it is determined that the cylinder pressure is not equal to or larger than the lift pressure, i.e., the fork 11 is disposed at the lowermost position, the controller 20 closes the unload valve 35 for cargo handling, switches only the oil pump 32 for cargo handling to the on-load state (S8c), and transitions to the above-mentioned mode in which the engine is driven (S10).

Here, the reason for switching only the oil pump 32 for cargo handling to the on-load state and maintaining the oil pump 33 for steering in the unload state when the fork 11 is disposed at the lowermost position is that, when the fork 11 is disposed at the lowermost position, if the steering mechanism 16 is driven and the fork 11 is moved, there is a possibility that the fork 11 may be damaged.

Hereinabove, in the embodiment, even when the plurality of operation orders are received during the idling-stop state, since only one operation order is performed, the engine 12 can be securely started by suppressing loads of the engine 12 and the electric motor 13 upon start of the engine.

Further, in the embodiment, when the order by manipulation of the cargo handling lever 17 and the order by manipulation of the handle 15 are received, an appropriate cylinder can be operated according to a circumstance of the fork driving cylinder 41. That is, in the embodiment, when one operation order in the plurality of operation orders is performed, circumstances of the hydraulic actuator corresponding to each operation order are recognized, and one appropriate operation order is performed corresponding to the recognized circumstances.

In addition, hereinabove, when the order by manipulation of the cargo handling lever 17 and the order by manipulation of the handle 15 are received, while the circumstances of the fork driving cylinder 41 are referenced, the order of priority related to the cylinders is predetermined, and only the oil pump of the cylinder having the order of high priority may switch to the on-load state with reference to the order of priority. In this case, the order of priority of the fork driving cylinder 41 is set to be higher than that of the steering driving cylinder 45.

Third Embodiment

Next, a vehicle according to a third embodiment of the present invention will be described with reference to FIGS. 5 and 6.

Figure 5:
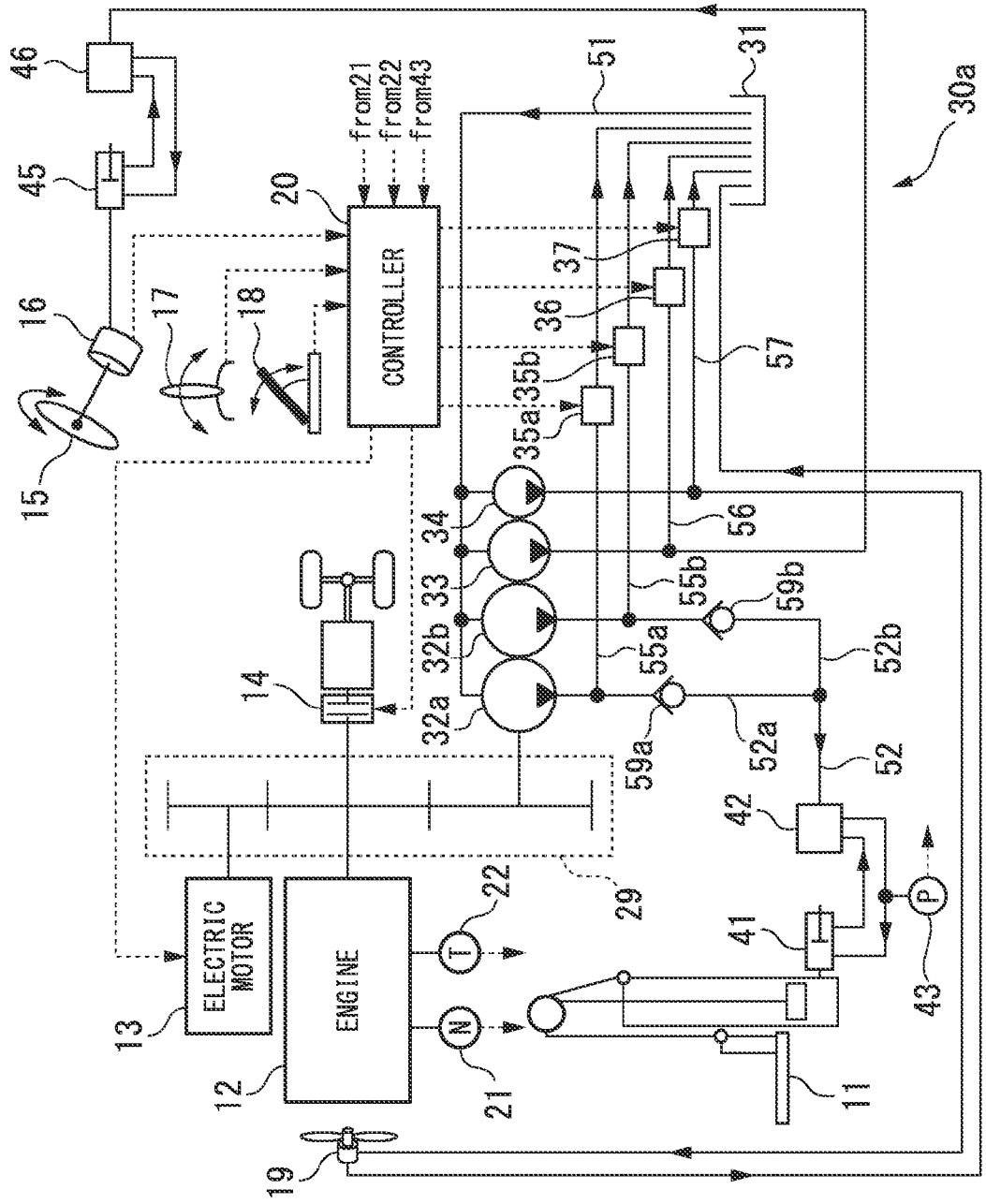
FIG. 5 is a view for describing a configuration of a vehicle according to a third embodiment of the present invention.
Figure 6:
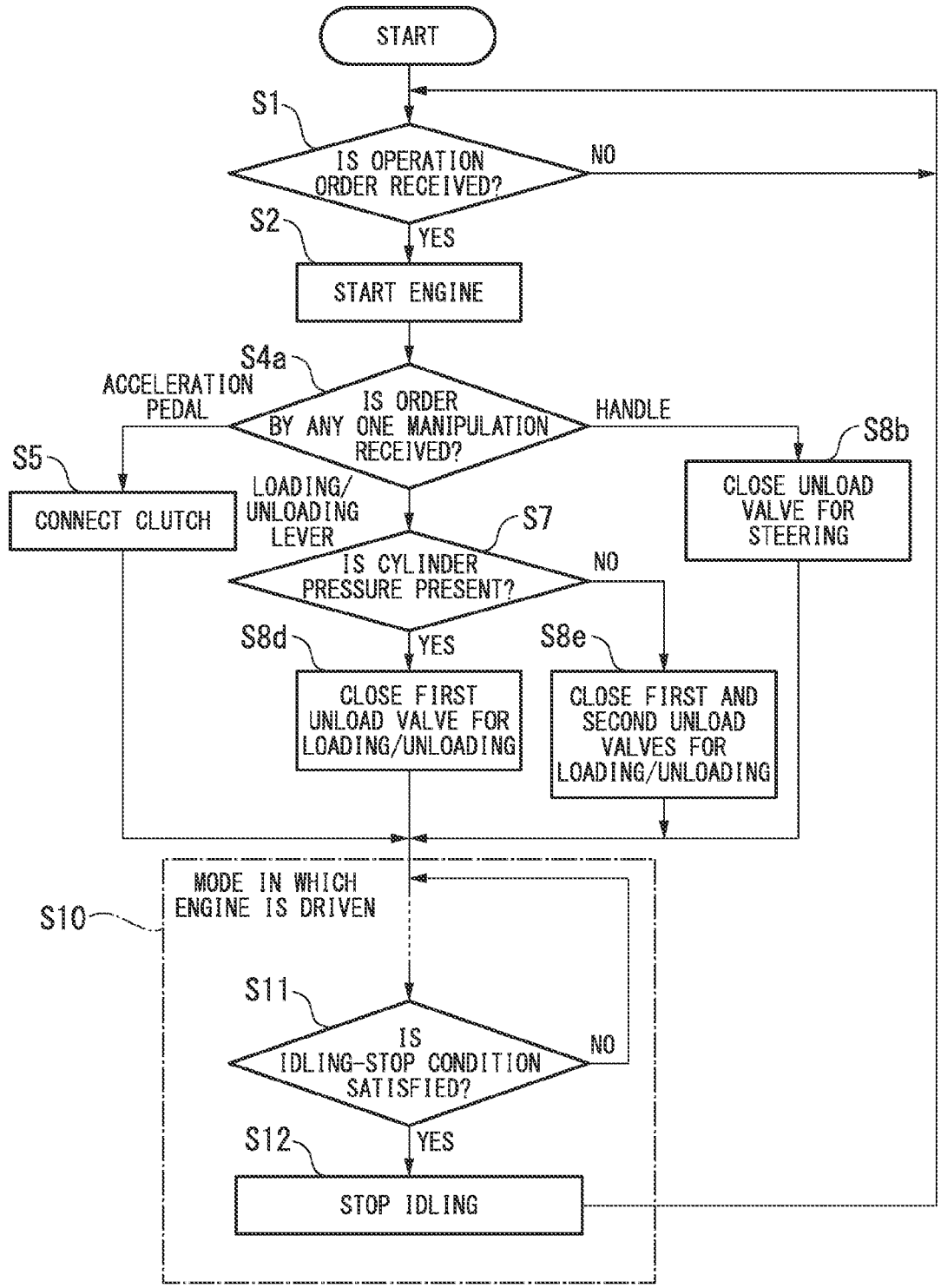
FIG. 6 is a flowchart showing an operation of a controller according to the third embodiment of the present invention.

As shown in FIG. 5, the vehicle of the embodiment is a forklift having basically the same configuration as shown in FIG. 1. However, a hydraulic circuit 30a of the embodiment includes two pumps, i.e., a first oil pump 32a for cargo handling and a second oil pump 32b for cargo handling, which function as an oil pump for cargo handling, and unload valves 35a and 35b for cargo handling are installed at each of the oil pumps 32a and 32b.

Ejection lines 52a and 52b are connected to the oil pumps 32a and 32b for cargo handling, respectively, which become one ejection line 52 at a downstream side thereof. Return lines 55a and 55b are branched from the ejection lines 52a and 52b, and the above-mentioned unload valves 35a and 35b for cargo handling are installed at the return lines 55a and 55b.

As described above, since the hydraulic circuit 30a of the embodiment is slightly different from the hydraulic circuit 30 of the first embodiment, an operation of a controller 20 of the embodiment is different from that of the controller 20 of the first embodiment. Hereinafter, an operation of the controller 20 will be described with reference to the flowchart shown in FIG. 6.

Like the first embodiment, during an idling-stop state, when any one of the acceleration pedal 18, the handle 15 and the cargo handling lever 17 is manipulated and an operation order from any one of them is received (S1), the controller 20 drives the electric motor 13 and starts the engine 12 (S2).

Next, the controller 20 determines what was manipulated to cause the operation order (S4a). When it is determined that the order is the order by manipulation of the acceleration pedal 18, like the first embodiment, the controller 20 transitions to a mode in which an engine is driven (S10) after clutch connection processing (S5) is performed.

In step 4a, when it is determined that the order is the operation order by manipulation of the handle 15, the controller 20 closes the unload valve 36 for steering, switches the oil pump 33 for steering to the on-load state (S8b), and then transitions to the mode in which the engine is driven (S10).

In addition, in step 4a, when it is determined that the order is the operation order by manipulation of the cargo handling lever 17, the controller 20 acquires output from the cylinder pressure sensor 43 of the fork driving cylinder 41 and determines whether a cylinder pressure is present or not (S7). When it is determined that the cylinder pressure is present, in order to switch only one of the oil pumps 32a and 32b for cargo handling to the on-load state, the controller 20 closes only a corresponding one of the first unload valve 35a for cargo handling and the second unload valve 35b for cargo handling (S8d), and then transitions to the mode in which the engine is driven (S10). As a result, in the two oil pumps 32a and 32b for cargo handling, oil from only one of the oil pumps 32a and 32b for cargo handling is sent to the fork driving cylinder 41 via the control valve 42 for cargo handling, and the fork driving cylinder 41 is driven.

Here, when the other unload valve 35b is opened even though one unload valve 35a of the first unload valve 35a for cargo handling and the second unload valve 35b for cargo handling is closed, the oil from the oil pump 32s for cargo handling corresponding to the one unload valve 35a flows into the oil tank 31 via the other unload valve 35b, and the oil pump 32a for cargo handling does not switch to the on-load state. Here, in the embodiment, as shown in FIG. 5, before the ejection lines 52a and 52b of the oil pumps 32a and 32b for cargo handling join each other, check valves 59a and 59b are installed at the ejection lines 52a and 52b, respectively, and the oil from the oil pump 32a for cargo handling corresponding to the one unload valve 35a is prevented from flowing into the oil tank 31 via the other unload valve 35b.

In step 7, when it is determined that there is no cylinder pressure, in order to switch both of the two oil pumps 32a and 32b for cargo handling to the on-load state, the controller 20 closes the first unload valve 35a for cargo handling and the second unload valve 35b for cargo handling (S8e), and then transitions to the mode in which the engine is driven (S10).

Hereinabove, in the embodiment, in the case in which a plurality of oil pumps are provided at a certain cylinder, when the cylinder pressure is present with reference to the cylinder pressure applied to the cylinder, since a small number of oil pumps switch to the on-load state, loads of the engine 12 and the electric motor 13 when the engine starts can be suppressed, and the engine 12 can be securely started.

In addition, here, while the case in which two oil pumps corresponding to the certain cylinder are provided has been exemplified, three or more oil pumps may be provided. In this case, a number of oil pumps that switch to the on-load state is determined such that the number of oil pumps that switch to the on-load state is reduced as the cylinder pressure is increased, and the number of oil pumps switch to the on-load state.

Hereinabove, while the plurality of embodiments related to the forklift have been described, the embodiments of the present invention are not limited to the forklift but may be applied to any vehicle as long as the vehicle includes a hydraulic cylinder, an oil pump thereof, and a motor configured to drive the oil pump and provide a travel-driving force, for example, a shovel car or the like.

In addition, in the above-mentioned embodiments, while a state in which any one of the acceleration pedal 18, the handle 15, and the cargo handling lever 17 is not manipulated for a predetermined time is referred to as the idle-stop condition, a condition in which a brake is applied may be further added, and further, a condition in which the temperature of the engine 12 is lower than a predetermined temperature may be added.

INDUSTRIAL APPLICABILITY

The present invention is applicable to an industrial vehicle such as a forklift or a shovel car, and in particular, to the case in which a hydraulic actuator is started with a small amount of manipulation and in a short amount of time from a state in which idling of a motor is stopped.

DESCRIPTION OF REFERENCE NUMERALS 11 fork
12 engine (motor)
13 electric motor
15 steering handle (manipulating end)
16 steering mechanism
17 cargo handling lever (manipulating end)
18 acceleration pedal (manipulating end)
20 controller
30 hydraulic circuit
30a hydraulic circuit
31 oil tank
32 oil pump for cargo handling (hydraulic power source)
32a first oil pump for cargo handling (hydraulic power source)
32b second oil pump for cargo handling (hydraulic power source)
33 oil pump for steering (hydraulic power source)
34 oil pump for fan (hydraulic power source)
35 unload valve for cargo handling
35a first unload valve for cargo handling
35b second unload valve for cargo handling
36 unload valve for steering
37 unload valve for fan
41 fork driving cylinder (hydraulic actuator)
42 control valve for cargo handling (hydraulic pressure maintaining device)
43 cylinder pressure sensor
45 steering driving cylinder (hydraulic pressure operating terminal)

The invention claimed is:

1. A vehicle comprising:
a hydraulic actuator operated by a hydraulic pressure;
a manipulating end configured to instruct an operation of the hydraulic actuator;
a hydraulic power source configured to apply a hydraulic pressure to the hydraulic actuator;
a motor configured to drive the hydraulic power source and provide a travel-driving force; and
a controller configured to determine whether a predetermined idle-stop condition is satisfied or not while the motor is driven, stop idling of the motor when satisfaction of the idle-stop condition is determined, and start the motor and switch the hydraulic power source of the hydraulic actuator to an on-load state when an operation order given to the hydraulic actuator by manipulation of the manipulating end is received while the idling of the motor is stopped, wherein the plurality of hydraulic power sources configured to apply a hydraulic pressure to the hydraulic actuator, a hydraulic pressure maintaining device configured to maintain the hydraulic pressure applied to the hydraulic actuator when all of the plurality of hydraulic power sources switch to an unload state, and a hydraulic pressure detector configured to detect the hydraulic pressure applied to the hydraulic actuator are installed in the hydraulic actuator; and while the idling of the motor is stopped, when an operation order given to the hydraulic actuator is received, the controller starts the motor, acquires a hydraulic pressure applied to the hydraulic actuator maintained by the hydraulic pressure maintaining device using the hydraulic pressure detector, and switches a number of hydraulic power sources based on a magnitude of the hydraulic pressure to the on-load state.

2. The vehicle according to claim 1, wherein, while the idling of the motor is stopped, when the operation order with respect to the hydraulic actuator is received, the controller starts the motor, and switches the hydraulic power source of the hydraulic actuator to the on-load state before the motor reaches a predetermined idling revolution number region.

3. The vehicle according to claim 1, wherein the plurality of hydraulic actuators, the manipulating ends corresponding to the plurality of hydraulic actuators, and the hydraulic power sources corresponding to the plurality of hydraulic actuators are provided, and while the idling of the motor is stopped, among the plurality of hydraulic actuators, when an operation order given to two or more hydraulic actuators is received by the time the motor is started, the controller starts the motor based on a previously received operation order, determines the hydraulic actuator having the order of the highest priority among the two or more hydraulic actuators with reference to a predetermined order of priority, and switches only the hydraulic power source of the hydraulic actuator to the on-load state.

4. The vehicle according to claim 2, wherein the plurality of hydraulic actuators, the manipulating ends corresponding to the plurality of hydraulic actuators, and the hydraulic power sources corresponding to the plurality of hydraulic actuators are provided, and while the idling of the motor is stopped, among the plurality of hydraulic actuators, when an operation order given to two or more hydraulic actuators is received by the time the motor is started, the controller starts the motor based on a previously received operation order, determines the hydraulic actuator having the order of the highest priority among the two or more hydraulic actuators with reference to a predetermined order of priority, and switches only the hydraulic power source of the hydraulic actuator to the on-load state.

5. The vehicle according to claim 1, wherein the plurality of hydraulic actuators, the manipulating end corresponding to the plurality of hydraulic actuators, and the hydraulic power sources corresponding to the plurality of hydraulic actuators are provided, a hydraulic pressure maintaining device and a hydraulic pressure detector are installed at the at least one hydraulic actuator among the plurality of hydraulic actuators, wherein when the one hydraulic actuator transitions to an unload state from the on-load state, the hydraulic pressure maintaining device maintains a hydraulic pressure applied to one hydraulic actuator, and the hydraulic pressure detector detects a hydraulic pressure applied to the one hydraulic actuator, and while the idling of the motor is stopped, when an operation order given to two hydraulic actuators including the one hydraulic actuator among the plurality of hydraulic actuators is received by the time the motor is started, the controller starts the motor based on a previously received operation order, acquires a hydraulic pressure applied to the one hydraulic actuator maintained by the hydraulic pressure maintaining device using the hydraulic pressure detector, and switches only the hydraulic power source of any one hydraulic actuator of the two hydraulic actuators to the on-load state according to a magnitude of the hydraulic pressure.

6. The vehicle according to claim 2, wherein the plurality of hydraulic actuators, the manipulating end corresponding to the plurality of hydraulic actuators, and the hydraulic power sources corresponding to the plurality of hydraulic actuators are provided, a hydraulic pressure maintaining device and a hydraulic pressure detector are installed at the at least one hydraulic actuator among the plurality of hydraulic actuators, wherein when the one hydraulic actuator transitions to an unload state from the on-load state, the hydraulic pressure maintaining device maintains a hydraulic pressure applied to one hydraulic actuator, and the hydraulic pressure detector detects a hydraulic pressure applied to the one hydraulic actuator, and while the idling of the motor is stopped, when an operation order given to two hydraulic actuators including the one hydraulic actuator among the plurality of hydraulic actuators is received by the time the motor is started, the controller starts the motor based on a previously received operation order, acquires a hydraulic pressure applied to the one hydraulic actuator maintained by the hydraulic pressure maintaining device using the hydraulic pressure detector, and switches only the hydraulic power source of any one hydraulic actuator of the two hydraulic actuators to the on-load state according to a magnitude of the hydraulic pressure.

7. A method of controlling a vehicle comprising a hydraulic actuator operated by a hydraulic pressure, a manipulating end configured to instruct an operation of the hydraulic actuator, a hydraulic power source configured to apply a hydraulic pressure to the hydraulic actuator, and a motor configured to drive the hydraulic power source and provide a travel-driving force, wherein the plurality of hydraulic power sources configured to apply a hydraulic pressure to the hydraulic actuator, a hydraulic pressure maintaining device configured to maintain the hydraulic pressure applied to the hydraulic actuator when all of the plurality of hydraulic power sources switches to an unload state, and a hydraulic pressure detector configured to detect the hydraulic pressure applied to the hydraulic actuator are installed at the hydraulic actuator, the method comprising:

an idling-stop process of determining whether a predetermined idle-stop condition is satisfied when the motor is driven, and stopping idling of the motor when it is determined that the idle-stop condition is satisfied; and an idling-stop release process of starting the motor, acquiring a hydraulic pressure applied to the hydraulic actuator maintained by the hydraulic pressure maintaining device using the hydraulic pressure detector, and switching a number of the hydraulic power source based on a magnitude of the hydraulic pressure to an on-load state when an operation order given to the hydraulic actuator by manipulation of the manipulating end is received while the idling of the motor is stopped.

8. The method of controlling the vehicle according to claim 7, wherein, in the idling-stop release process, while the idling of the motor is stopped, when the operation order given to the hydraulic actuator is received, the motor is started, and before the motor reaches a predetermined idling revolution number, the hydraulic power source of the hydraulic actuator switches to the on-load state.

* * * * *